(12) United States Patent
Numata

(10) Patent No.: US 8,832,021 B2
(45) Date of Patent: Sep. 9, 2014

(54) IMAGE PROCESSING APPARATUS, CONTROL METHOD, AND STORAGE MEDIUM

(75) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/940,928

(22) Filed: Nov. 5, 2010

(65) Prior Publication Data

US 2011/0137857 A1    Jun. 9, 2011

(30) Foreign Application Priority Data

Dec. 7, 2009    (JP) .................................. 2009-278012

(51) Int. Cl.
*G06F 17/30* (2006.01)
*G06F 11/14* (2006.01)
*H04N 1/32* (2006.01)

(52) U.S. Cl.
CPC ........ *H04N 1/32128* (2013.01); *G06F 11/1461* (2013.01); *H04N 2201/3209* (2013.01); *H04N 1/32416* (2013.01); *G06F 11/1448* (2013.01); *H04N 1/324* (2013.01); *H04N 1/32432* (2013.01); *H04N 2201/3205* (2013.01); *H04N 2201/3229* (2013.01); *H04N 2201/3208* (2013.01); *G06F 11/1469* (2013.01)
USPC ......................................................... 707/609

(58) Field of Classification Search
USPC ............................ 707/2, 3, 204, 609; 709/217
See application file for complete search history.

(56) References Cited

U.S. PATENT DOCUMENTS

| | | | |
|---|---|---|---|
| 5,911,776 A * | 6/1999 | Guck ............................ 709/217 |
| 6,542,901 B1 * | 4/2003 | Devine et al. ........................ 1/1 |
| 7,330,997 B1 * | 2/2008 | Odom ......................... 714/6.23 |
| 8,352,432 B2 * | 1/2013 | Prahlad et al. ................ 707/640 |
| 2004/0267819 A1 * | 12/2004 | Shinkai et al. ............. 707/104.1 |
| 2005/0246631 A1 * | 11/2005 | Mori et al. ..................... 715/515 |
| 2007/0124345 A1 * | 5/2007 | Heinz et al. ................... 707/204 |
| 2008/0046670 A1 * | 2/2008 | Lam ............................... 711/161 |
| 2008/0177807 A1 * | 7/2008 | Dile et al. ..................... 707/204 |
| 2008/0192723 A1 * | 8/2008 | Kwon .......................... 370/345 |
| 2009/0063430 A1 * | 3/2009 | Anglin et al. ..................... 707/3 |
| 2009/0204804 A1 * | 8/2009 | Okubo .......................... 713/100 |
| 2009/0237715 A1 * | 9/2009 | Kasatani ..................... 358/1.15 |
| 2009/0307534 A1 * | 12/2009 | Sakuramoto et al. ........... 714/47 |
| 2010/0095295 A1 * | 4/2010 | Harada ......................... 717/176 |

FOREIGN PATENT DOCUMENTS

| JP | 2005-149025 A | 6/2005 |
| JP | 2007-081618 A | 3/2007 |

* cited by examiner

*Primary Examiner* — Etienne Leroux
(74) *Attorney, Agent, or Firm* — Carter, DeLuca, Farrell & Schmidt, LLP

(57) ABSTRACT

An apparatus includes a creating unit that creates a plurality of files different in file format from identical setting information stored in a storage unit of the apparatus, a receiving unit that receives at least one of the created plurality of files, a determination unit that determines a file to be used among the plurality of received files according to at least one of the file formats of the plurality of files and dates of updates of the plurality of files, and an updating unit that updates the stored setting information using the determined file.

24 Claims, 14 Drawing Sheets

FIG.3

DESTINATION TABLE

DESTINATION TABLE — 301
- ALL
- DESTINATION TABLE 1
- DESTINATION TABLE 2
- DESTINATION TABLE 3
- DESTINATION TABLE 4
- DESTINATION TABLE 5
- DESTINATION TABLE 6
- DESTINATION TABLE 7
- DESTINATION TABLE 8
- DESTINATION TABLE 9
- DESTINATION TABLE 10

DESTINATION TYPE — 302
- ALL
- ALL
- E-MAIL
- FACSIMILE
- FILE

303

| No. | TYPE | DESTINATION NAME | DESTINATION |
|---|---|---|---|
| 1 | E-MAIL | user1 | user1@testmail.com |
| 2 | FACSIMILE | XXXX CORPORATION | 03-1111-xxxx |
| 3 | FILE | SHARED FOLDER | 192.168.11.11 |

REGISTER — 304
EDIT — 305
DELETE — 306

CANCEL    OK

FIG.4

| DESTINATION TABLE NO. | No. | DESTINATION TYPE | DESTINATION NAME | DESTINATION | PROTOCOL | ACCOUNT | PASSWORD |
|---|---|---|---|---|---|---|---|
| DESTINATION TABLE 1 | 1 | E-MAIL | USER 1 | user1@testmail.com | | | |
| DESTINATION TABLE 1 | 2 | FACSIMILE | XXXX CORPORATION | 03-1111-xxxx | | | |
| DESTINATION TABLE 1 | 3 | FILE | SHARED FOLDER 1 | 192.168.11.11¥share | SMB | Administrator | xxxxxxx |
| DESTINATION TABLE 2 | 1 | E-MAIL | USER 2 | user2@testmail.com | | user2 | xxxxxxx |
| DESTINATION TABLE 3 | 1 | FACSIMILE | XXXX INDUSTRY | 045-222-xxxx | | | |

FIG.7

```
Bakup_192168001001

AddressBook1.abk         AddressBook6.abk
    AddressBook1.csv         AddressBook6.csv
    AddressBook2.abk         AddressBook7.abk
    AddressBook2.csv         AddressBook7.csv
    AddressBook3.abk         AddressBook8.abk
    AddressBook3.csv         AddressBook8.csv
    AddressBook4.abk         AddressBook9.abk
    AddressBook4.csv         AddressBook9.csv
    AddressBook5.abk         AddressBook10.abk
    AddressBook5.csv         AddressBook10.csv
```

FIG.8

```
AddressBook version: 1 addressbookid: 1
uuid: xxxx-xxx-xxxx-xxxx-xxxxxxxxx
cn: user1
mailaddress: user1@testmail.com
accesscode: 0
protocol: smtp
objectclass: top
objectclass: email addressbookid: 1
uuid: xxxx-xxx-xxxx-xxxx-xxxxxxxxx
cn: XXXX CORPORATION
dial:03-1111-xxxx
accesscode: 0
protocol: fax
objectclass: top
objectclass: fax addressbookid: 1
uuid: xxxx-xxx-xxxx-xxxx-xxxxxxxxx
cn: SHARED FOLDER 1
url:192.168.11.11
path: share
username: Administrator
pwd: xxxxxxxxxxxxxxxxxxxxxxxxxx
accesscode: 0
protocol: smb
objectclass: top
objectclass: remotefilesystem
```

FIG.9

| | A | B | C | D | E | F | G |
|---|---|---|---|---|---|---|---|
| 1 | | | | IMPORT FILE OF DESTINATION INFORMATION (* IS DESCRIBED ONLY WHEN THE DESTINATION TYPE IS E-MAIL OR FILE) | | | |
| 2 | | | | | | | |
| 3 | DESTINATION TABLE NO. | DESTINATION TYPE | DESTINATION NAME | DESTINATION | PROTOCOL (*) | ACCOUNT (*) | PASSWORD (*) |
| 4 | 1 | E-MAIL | USER 1 | user1@testmail.com | | | |
| 5 | 1 | FACSIMILE | XXXX CORPORATION | 03-1111-xxxx | | | |
| 6 | 1 | FILE | SHARED FOLDER 1 | 192.168.11.11¥share | SMB | Administrator | xxxxxxx |

FIG.13

IMPORT OF DESTINATION INFORMATION

1301 — DESIGNATE BACKUP FILE TO BE IMPORTED (ABK FORMAT OR CSV FORMAT) OR FOLDER IN WHICH BACKUP FILES ARE STORED

- STORAGE LOCATION OF BACKUP FILE: FILE SERVER
  - FILE SERVER
  - FTP SERVER
  - HDD OF MFP
- FOLDER/FILE PATH:
- USER NAME:
- PASSWORD:

1302 — SETTING OF EXECUTION SCHEDULE

- EXECUTION SCHEDULE: EXECUTE NOW
  - EXECUTE NOW
  - EXECUTE ON DESIGNATED DATE
  - EXECUTE MONTHLY
  - EXECUTE WEEKLY
- EXECUTION DATE: (yyyy/mm/dd)
- EXECUTION START TIME: (hh/mm)

1303 — PRIORITY OPERATION SETTING IN THE CASE WHERE FILES IN DIFFERENT FORMATS ARE DESIGNATED FOR ONE DESTINATION TABLE

- ⦿ PLACE PRIORITY ON BACKUP FILE HAVING NEWER UPDATE DATE
- ○ PLACE PRIORITY ON BACKUP FILE IN CSV FORMAT
- ○ PLACE PRIORITY ON BACKUP FILE IN ABK FORMAT

[ CANCEL ]  [ OK ]

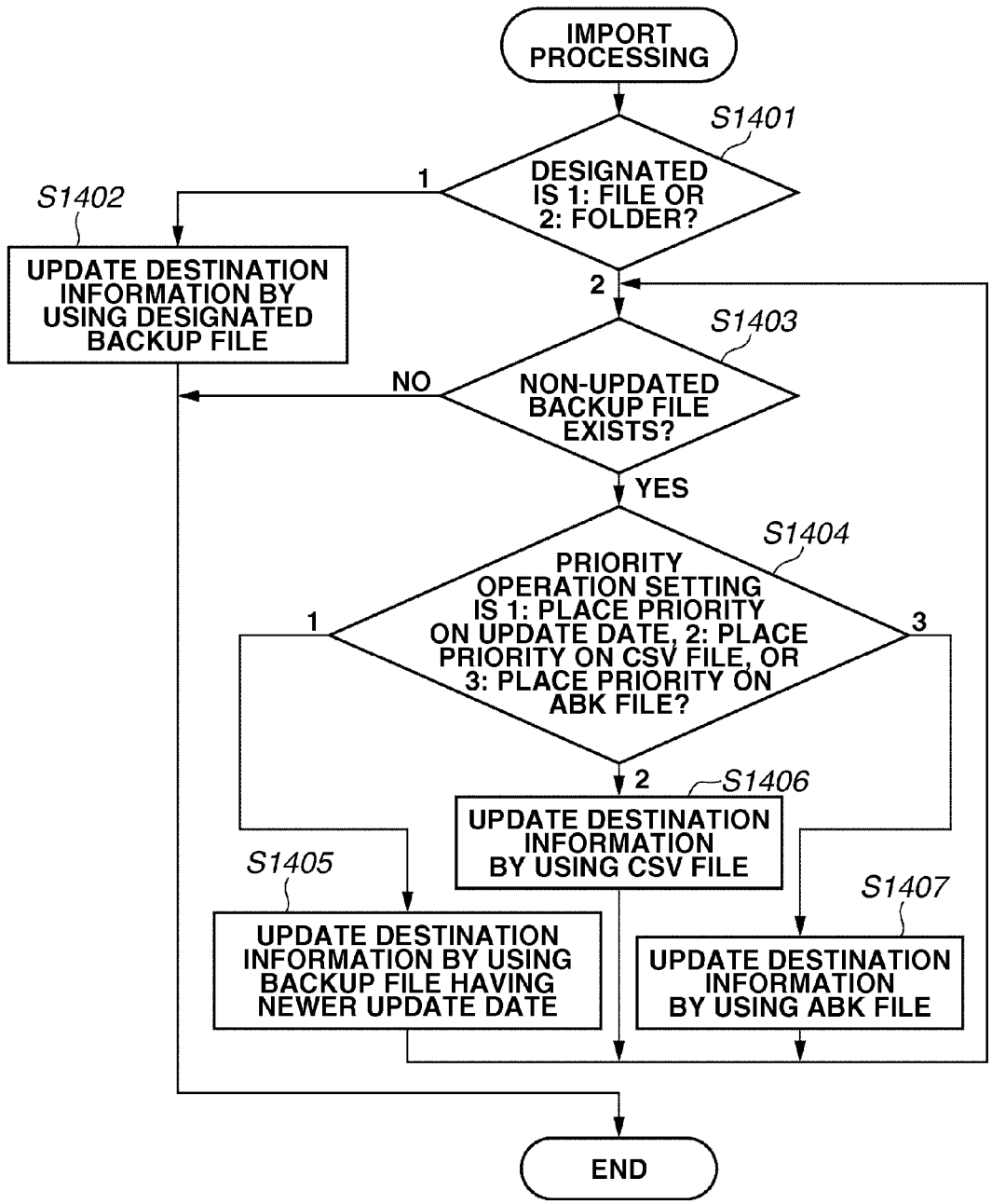

US 8,832,021 B2

IMAGE PROCESSING APPARATUS, CONTROL METHOD, AND STORAGE MEDIUM

BACKGROUND OF THE INVENTION

1. Field of the Invention

The present invention relates to an image processing apparatus, a control method, and a storage medium for performing backup and update of setting information registered in a storage unit.

2. Description of the Related Art

In a multifunction peripheral (MFP) having a function of facsimiling a scanned image, a function of sending an e-mail, and the like, it is possible to register information of destination (hereinafter referred to as destination information) such as a facsimile number, an e-mail address, an address of a network client, and the like of the destination in a storage unit. Also, it is possible to register department identification data (ID), log-in user information, and the like in the storage unit of the MFP. In the present specification, the information registered in the storage unit of the MFP and used when various pieces of processing are executed by the MFP is referred to as setting information of the MFP.

It is possible to perform backup by creating a backup file from the setting information registered in the MFP and outputting the backup file to an external apparatus. Further, it is possible to restore the setting information registered in MFP from the information described in the backup file by inputting the backed-up backup file into the MFP as it is.

For example, Japanese Patent Application Laid-Open No. 2005-149025 discusses a technique of backing up a backup file created by encrypting data of an address book in an external apparatus and decrypting the backup file for restoring. Also, Japanese Patent Application Laid-Open No. 2007-081618 discusses a technique of backing up data of an address book in an external apparatus by converting the data into a friend-of-a-friend (FOAF) format that is easily processed by a computer.

In the present invention, the external output of the file created from the destination information is described as backup of destination information, and the file created for the external output is described as a backup file. The restoring the destination information registered in the MFP to the information described in the backup file by inputting the backup file into the MFP as it is, is described as restoration of the destination information. Further, overwriting of the destination information by a user by editing the backup file and inputting the edited file into the MFP is described as import of the destination information. The restoration and the import of the destination information are collectively described as an update of the destination information.

The external output of the setting information such as the destination information as the backup file is used for the restoration and for the import. However, in the above-mentioned conventional techniques, the file format of the backed-up file is intended to be processed by computer, and it is considerably difficult for a human being to edit the output file. In other words, it is difficult to apply the above-mentioned techniques to importing of the setting information. In contrast, when a backup file is created as a file in a comma separated values (CSV) format, for example, which is easier for a human being to edit, a time required for processing by computer is increased when the file is created only for restore despite the advantage of easy edit by user. Therefore, it is desired that the backup file be created in a format that meets a usage.

However, in general use, even when a file was backed up to restore the setting information, edit of the file and import thereof to an MFP may be suddenly desired. Thus, in many cases, a usage of a file is not clearly determined at the time of backup.

SUMMARY OF THE INVENTION

An aspect of the present invention provides an apparatus including a creating unit that creates a plurality of files different in file format from identical setting information stored in a storage unit of the apparatus, a receiving unit that receives at least one of the created plurality of files, a determination unit that determines a file to be used among the received plurality of files, according to at least one of the file formats of the plurality of files and dates of updates of the plurality of files, and an updating unit that updates the stored setting information using the determined file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating one example of a screen for managing destination information.

FIG. 4 is a diagram illustrating one example of a data structure of destination information.

FIG. 7 is a diagram illustrating one example of a folder in which backup files are expanded.

FIG. 8 is a diagram illustrating one example of an automatic backup (ABK) file.

FIG. 9 is a diagram illustrating one example of a CSV file.

FIG. 13 is a diagram illustrating one example of a screen for instructing import of destination information.

FIG. 14 is a flowchart illustrating processing of the destination information import.

DESCRIPTION OF THE EMBODIMENTS

Various exemplary embodiments, features, and aspects of the invention will be described in detail below with reference to the drawings.

In the present specification, destination information will be described as one example of setting information of an image processing apparatus. However, the setting information is not limited to the destination information and may be other setting data such as a department ID and log-in user information.

Figure 1:
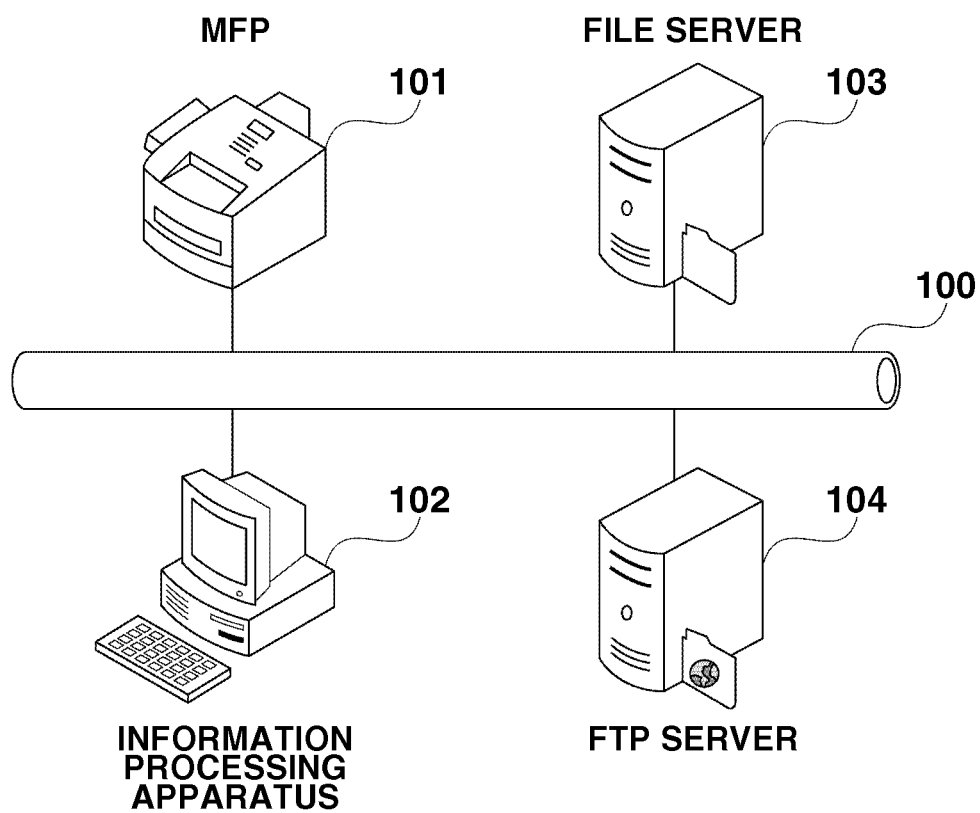
FIG. 1 is a diagram illustrating one configuration example according to one exemplary embodiment of the present invention.

FIG. 1 is a diagram illustrating one configuration example serving as a representative exemplary embodiment of the present invention. An MFP 101 is an image processing apparatus to which the present invention is applied, which is a multifunction apparatus having a plurality of functions such as a scanner function, a printer function, a facsimile function, and an e-mail sending function in addition to a copying function.

An information processing apparatus 102 is capable of giving various instructions such as backup, restoration, and import of destination information to the MFP 101 via a network 100. The information processing apparatus 102 is not always necessary, and configuration of giving the above-described instructions by using an operation unit of the MFP 101 is included in another exemplary embodiment described below in this specification.

Each of a file server 103 and a file transfer protocol (FTP) server 104 can be designated as a storage location of a backup file of the destination information. It is not always necessary to have both of the file server 103 and the FTP server 104, and only one of them is sufficient. Also, it is apparent for those skilled in the art that both of the file server 103 and the FTP server 104 are not required when a hard disk drive (HDD) of the MFP 101 or the information processing apparatus 102 is selected as the storage location of the backup file in FIG. 5 described below in this specification.

Figure 2:
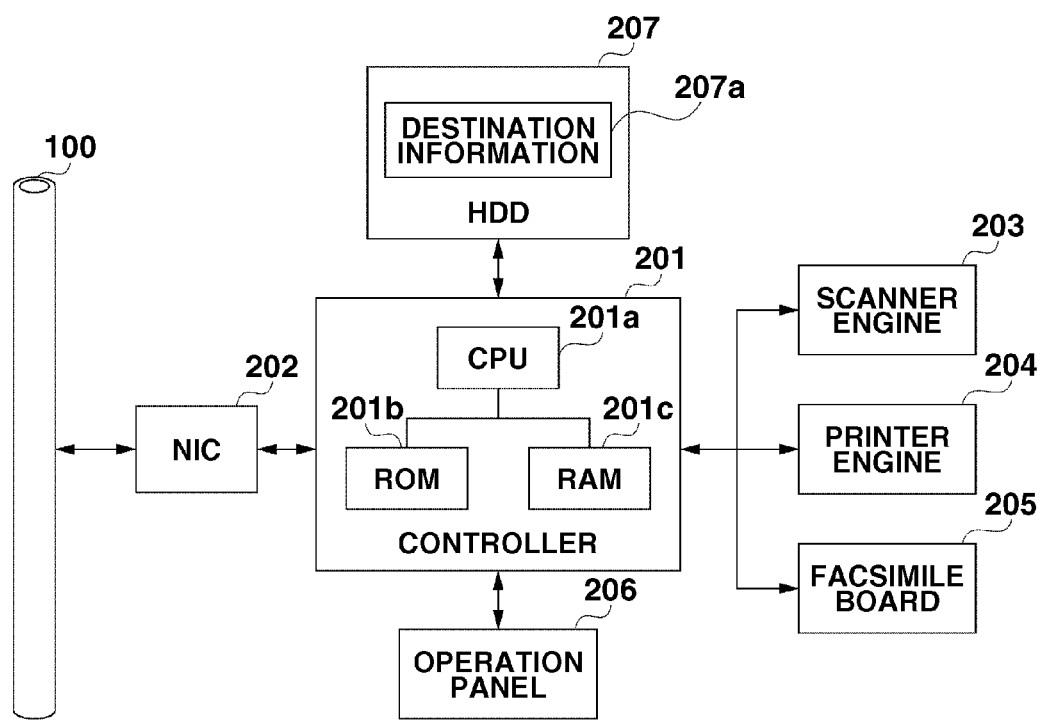
FIG. 2 is a block diagram illustrating one function configuration example of an MFP.

FIG. 2 is a block diagram illustrating one function configuration example of the MFP 101. A central processing unit (CPU) 201a of a controller 201 executes a program stored in a read-only-memory (ROM) 201b by using a random-access-memory (RAM) 201c as a work memory. The CPU 201a controls component parts (a scanner engine 203, a printer engine 204, a facsimile board 205, an operation panel 206, etc.) of the MFP 101 by way of the execution of the program so that the following jobs are executed. Also, the controller 201 is capable of communication with an external apparatus (an information processing apparatus 102, a file server 103, an FTP server 104, etc.) on the network 100 via a network interface card (NIC) 202.

The printer engine 204 is a printer of a laser beam method, an inkjet method, or other method. The facsimile board 205 realizes a facsimile function such as a communication control for facsimile transmission/reception of an image. The operation panel 206 includes a liquid crystal display (LCD), a keyboard, and the like, for example, to display information received from the controller 201 and to send an instruction input by a user by operating the keyboard to the controller 201. The controller 201 selects the printer engine 204 and the scanner engine 203 in response to an instruction of a copying job given via the operation panel 206 and executes the copying job of copying an image of an original document placed on a platen.

Also, the controller 201 selects the printer engine 204 upon reception of a print job given via the NIC 202 and executes the received print job. Further, the controller 201 selects the scanner engine 203 in response to an instruction of a scan job given via the NIC 202 or the operation panel 206 and obtains an image (scanned image) of an original document placed on the platen. After that, the controller 201 executes the scan job of sending the obtained scanned image to a client personal computer (PC) or the like designated via the NIC 202 or the operation panel 206.

In response to an image send job given via the NIC 202, the controller 201 executes the job of sending a received image to a designated client (an external apparatus connected to the network 100) or the like. Also, the send job may be instructed from the information processing apparatus 102 or another MFP without limitation to the operation panel 206.

In response to an instruction of a facsimile transmission job or an e-mail send job given via the NIC 202 or the operation panel 206, the controller 201 receives an image via the NIC 202 or obtains an original image by the scanner engine 203. After that, the controller 201 selects the facsimile board 205 to execute the facsimile send job or sends an e-mail to which an image is attached via the NIC 202. In this case, it is possible to select a destination of the facsimile or the e-mail from the destination information 207a stored in the HDD 207 serving as a storage unit via the NIC 202 or the operation panel 206 from a destination information management screen (FIG. 3) described below in this specification. Further, when a facsimile is received via the facsimile board 205, the controller 201 causes the printer engine 204 to print out the received image.

Also, in response to an instruction for changing the destination information 207a given via the NIC 202 or the operation panel 206, the controller 201 changes the destination information 207a stored in the HDD 207. Further, upon reception of an instruction for backing up the destination information 207a given via the NIC 202 or the operation panel 206, the controller 201 stores a backup file of the destination information 207a in the file server 103, the FTP server 103, or the HDD 207. Upon reception of an instruction of restoration or an instruction of import of the destination information 207a given via the NIC 202 or the operation panel 206, the controller 201 updates the destination information 207a to the contents of the received backup file.

Illustrated in FIG. 3 is a screen for managing the destination information 207a, which is displayed on the operation panel 206 of the MFP 101 or the information processing apparatus 102 connected to the MFP 101 via the network 100. In the case of the display on the information processing apparatus 102, the management screen of FIG. 3 is displayed on a Web browser, for example. In the present exemplary embodiment, the destination information 207a is managed by 10 groups having names of destination table 1 to destination table 10. Also, there are three types of destinations, namely, an e-mail, a facsimile, and a file. It is not always necessary to manage the destination information as groups, and the types of the destinations are not limited to the above three types.

A destination table selection unit 301 is used for selecting a group among the groups of the destination tables. The destination information belonging to the group selected by the user is displayed on a destination information display unit 303. A destination type selection unit 302 is used for selecting the type of the destination (e-mail, facsimile, or file). The destination information that matches the type of the selected destination is displayed on the destination information display unit 303. The destination information display unit 303 is used for displaying the destination information. In the present exemplary embodiment, No., destination type, destination name, and destination are displayed, but the display contents are not limited to the above, and a configuration of displaying other items may be adopted.

A registration button 304 is used for registering new destination information. When the registration button 304 is pressed down by user's operation, a destination information registration screen (not illustrated) is displayed, and destination information based on contents input on the destination information registration screen is registered in the HDD 207 of the MFP 101. An edit button 305 is used for editing destination information selected on the destination information display unit 303 and is in a disabled state till the destination information is selected. When the edit button 305 is pressed down by user's operation, a destination information edit screen (not illustrated) is displayed, and the destination information selected among the destination information registered in the HDD 207 is edited based on contents input on the destination information edit screen.

A delete button 306 is used for deleting destination information selected on the destination information display unit 303 and is in a disabled state till the destination information is selected.

FIG. 4 is a diagram illustrating one example of a data structure of the destination information 207*a* to be stored in the HDD 207. The types of data and the data structure are not limited to the example, and other structures may be adopted. A method for storing destinations by varying data structures of the destinations depending on types of the destinations is another exemplary embodiment.

In the present data structure, a number of the destination table (destination table No.) to which the destination information belongs, a number (No.) in the destination table No., a destination type, an destination name, a destination, a protocol, an account, and a password are stored as the information. The account and the password are used for simple mail transfer protocol (SMTP) authorization of e-mail and for accessing the file server 103 and the FTP server 104.

Figure 5:
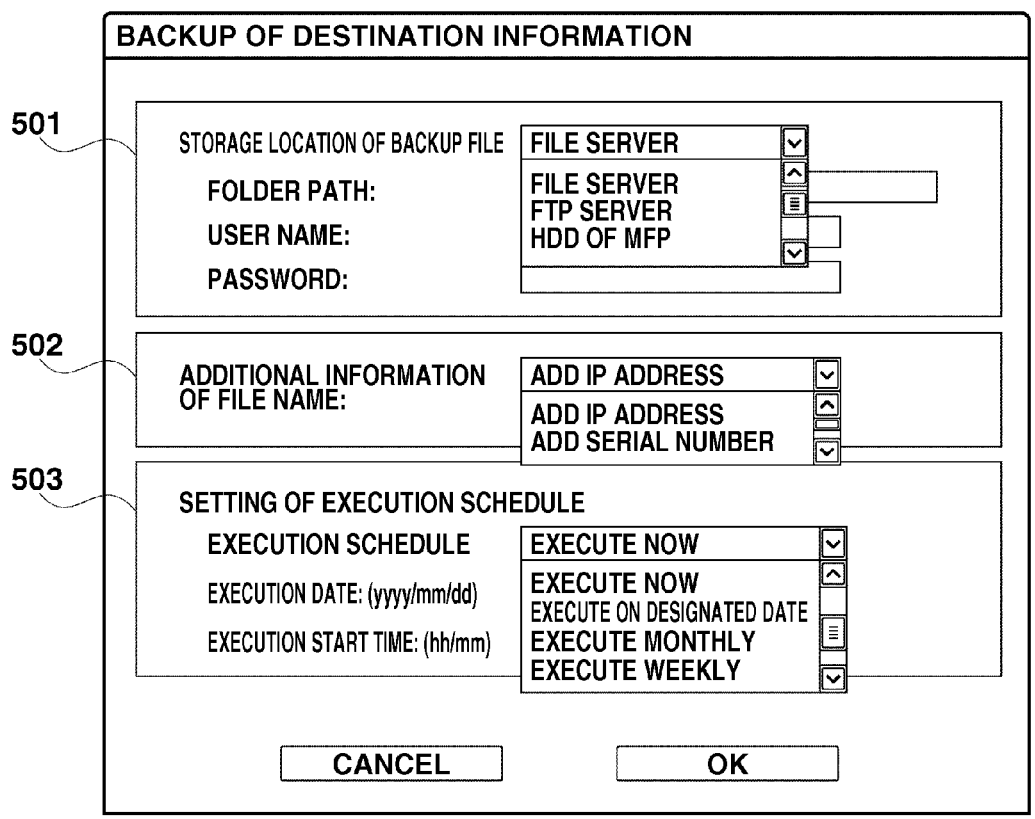
FIG. 5 is a diagram illustrating one example of a screen for instructing backup of destination information.

FIG. 5 illustrates a screen which is used for instructing backup of the destination information 207*a* and displayed on the operation panel 206 of the MFP 101 or the Web browser in the information processing apparatus 102 connected to the MFP 101 via the network 100.

A storage location setting unit 501 is used by the user for designating a storage location of a backup file of destination information. In the present exemplary embodiment, it is possible to select any one of the file server 103, the FTP server 104, and the HDD 207 of the MFP 101. It is possible to set a folder path and, when so required, authorization information such as a user name and a password for the selected storage location.

An additional information setting unit 502 is used for automatically designating information to be added to a file name of the backup file. In the present exemplary embodiment, it is possible to designate either one of an Internet protocol (IP) address of the MFP or a serial number of the MFP. By this setting, it is possible to determine to which MFP each of backup files of the destination information belongs when backup instructions for an identical storage location are given to the plurality of MFPs. The backup instruction is transmitted to the controller 201 via the operation panel 206 of the MFP 101 or the web browser of the information processing apparatus 102, and where the backup instruction is given from the information processing apparatus 102 will be described in the following exemplary embodiment.

An execution schedule setting unit 503 is used for designating a backup execution schedule. In the present exemplary embodiment, it is possible to designate any one of instantaneous execution, execution on designated date, monthly execution, and weekly execution as the execution schedule. Also, it is possible to set an execution date or an execution start time depending on the designated execution schedule. By the setting, it is possible to back up the destination information at fixed intervals in addition to the instantaneous execution. The storage location of backup file, the additional information to the file name, the execution schedule, and other settings are not limited to those described in the present exemplary embodiment, and other configurations may be adopted.

Figure 6:
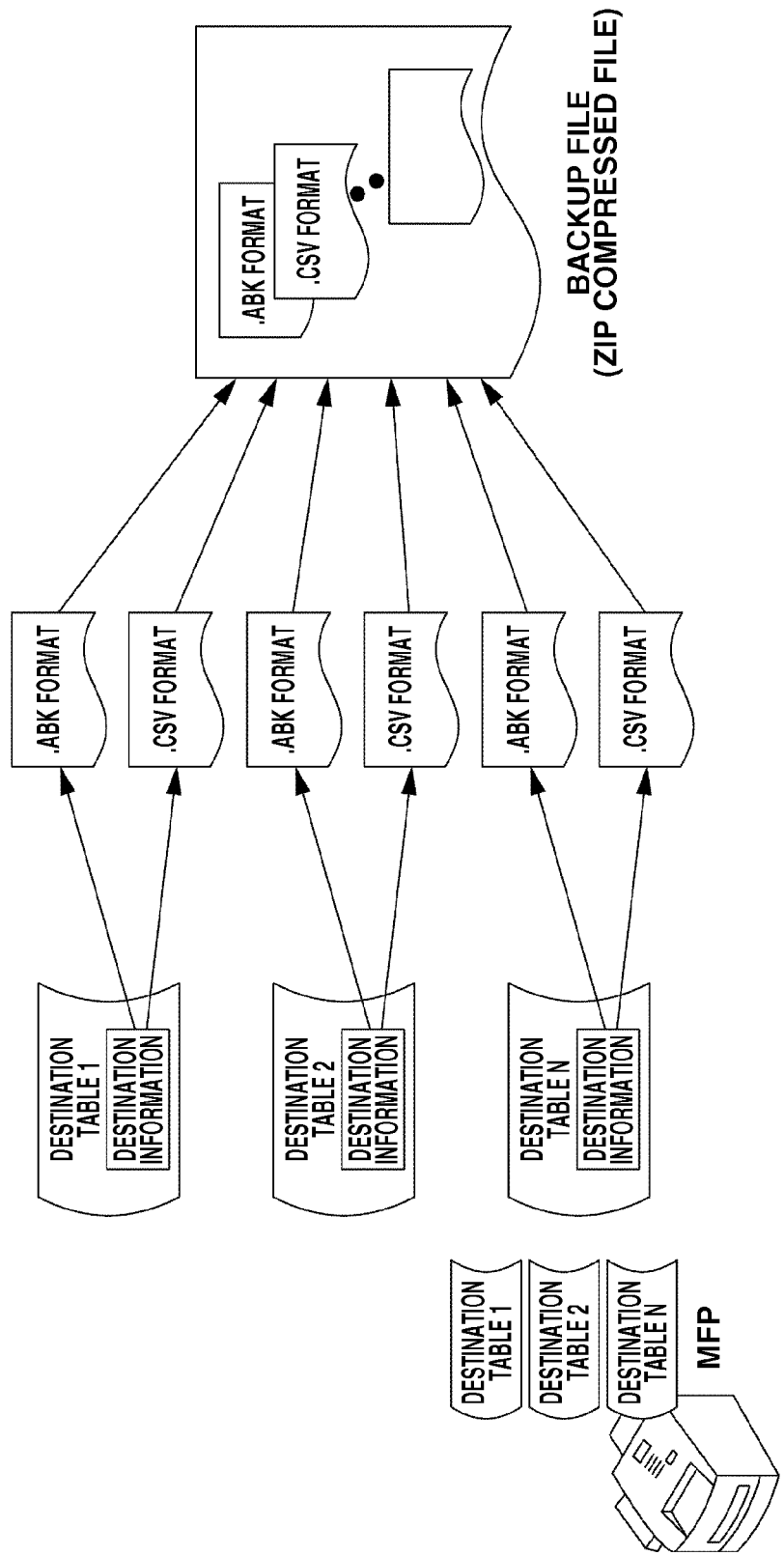
FIG. 6 is a schematic diagram illustrating a method for backing up destination information.

FIG. 6 is a schematic diagram illustrating a method for backing up destination information in the present exemplary embodiment. As described above, the destination information 207*a* is managed based on the groups which are termed the destination tables, by the HUD 207 of the MFP 101 in the present exemplary embodiment. Upon reception of a backup instruction from the information processing apparatus 102, the controller 201 creates backup files in two types of file formats of the ABK format and the CSV format for each of the destination tables, in each of which the destination information 207*a* is described. Characteristics of the ABK format and the CSV format are described below.

ABK Format

A file format intended for the case where a computer such as the MFP 101 and a PC (not illustrated) managing the MFP reads a file. The ABK format enables high speed processing by the computer as compared to the CSV format, but it is difficult for a user to edit the file in ABK format. Due to the high speed processing by the computer, an update processing time required for updating destination information is short as compared to the CSV format. Hereinafter, a file in ABK format will be described as an ABK file.

CSV Format

A file format of Comma Separated Values defined by Request for Comments (RFC). It is possible for a user to easily edit a file in CSV format by using software as compared to the ABK format, but a processing speed by the computer is inferior to the ABK format. Hereinafter, a file in CSV format will be described as a CSV file.

After the backup files in two types of formats are created, the backup files in two types of formats created for each of the destination information are ultimately collected into a ZIP file.

Though the backup files in two different formats are created in the present exemplary embodiment, the number of formats is not limited to two but two or more (plural). Also, the above two types of formats are only examples, and a file format of short update processing time (first file format) and a file format that is easily edited by a user (second file format) are not limited to the above-described file formats. Also, the backup files are ultimately collected in the ZIP format since the backup files are created for each of the destination tables in the present exemplary embodiment, but the backup files are not necessarily collected up in the ZIP format but may be collected up by another compression method. Hereinafter, the backup files collected up in the ZIP format are referred to as a compressed file, and the ABK file and the CSV file are simply referred to as backup files.

FIG. 7 illustrates one example of a folder displayed by expanding a compressed file. In the present exemplary embodiment, backup files in two types of formats of the ABK format and the CSV format are created for each of the destination information of the destination table 1 to the destination table 10.

FIG. 8 illustrates one example of the ABK file. Keys such as "uuid:" and "cn:" and values thereof are described in the file. It is difficult for a user who does not understand the keys to edit the file.

FIG. 9 illustrates one example of a CSV file corresponding to the description contents of the ABK file of FIG. 8. Explanation for the file and an advisory note are described on the first line for the purpose of facilitating editing by the user. Header items are described on the third line, so that the user can describe values corresponding to the headers on the fourth line or below the fourth line. As compared to the ABK file of FIG. 8, it is apparent that the file format is easily edited by the user.

Figure 10:
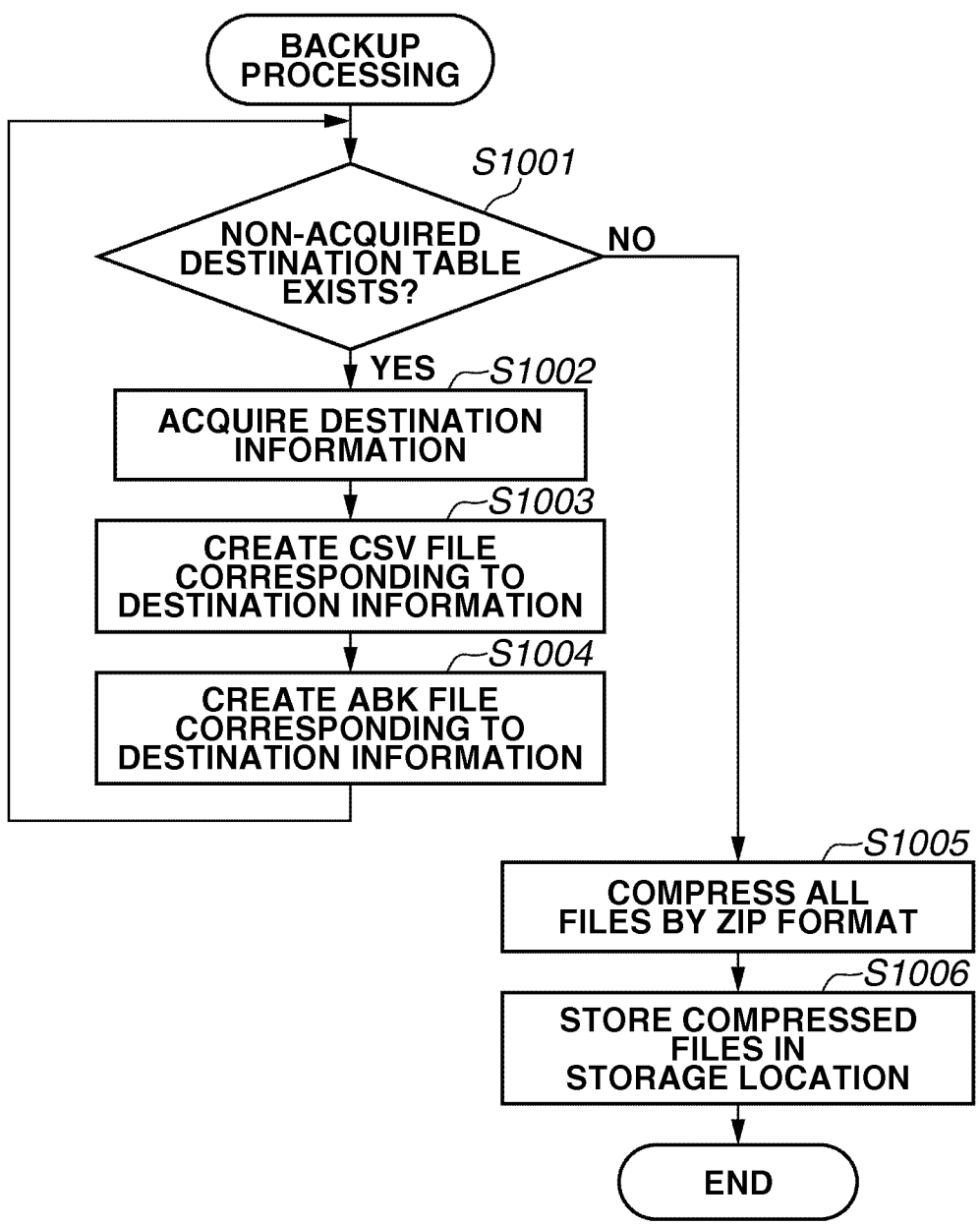
FIG. 10 is a flowchart illustrating processing of the destination information backup.

FIG. 10 illustrates a processing flowchart of backup processing of the destination information 207a. The processing is executed by the controller 201 of the MFP 101 when the information processing apparatus 102 gives the instruction for execution of backup based on the execution schedule set in FIG. 5.

In step S1001, the controller 201 determines whether there is a destination table that has not been acquired, in the HDD 207. The processing proceeds to step S1002 when there is the non-acquired table (Yes in step S1001), while the processing proceeds to step S1005 when there is not any non-acquired table (No in step S1001).

In step S1002, the controller 201 acquires the destination information 207a of the non-acquired destination table. In step S1003, the controller 201 creates a CSV file corresponding to the acquired destination information 207a. In step S1004, the controller 201 creates an ABK file corresponding to the same destination information 207a used in step S1003 and, after that, the processing proceeds to step S1001. By the processing of steps S1003 and S1004, the plurality of files in the file formats different from each other are created corresponding to the identical destination information of the MFP 101 stored in the HDD 207.

In step S1005, the controller 201 collects up the plurality of backup files of the different file formats created by the file creating processing of steps S1003 and S1004 as one compressed file. In step S1006, the controller 201 stores the compressed file created in step S1005 in the backup file storage location set in FIG. 5. Information relating to the storage location is included in the backup instruction that the controller 201 has received from the information processing apparatus 102.

Figure 11:
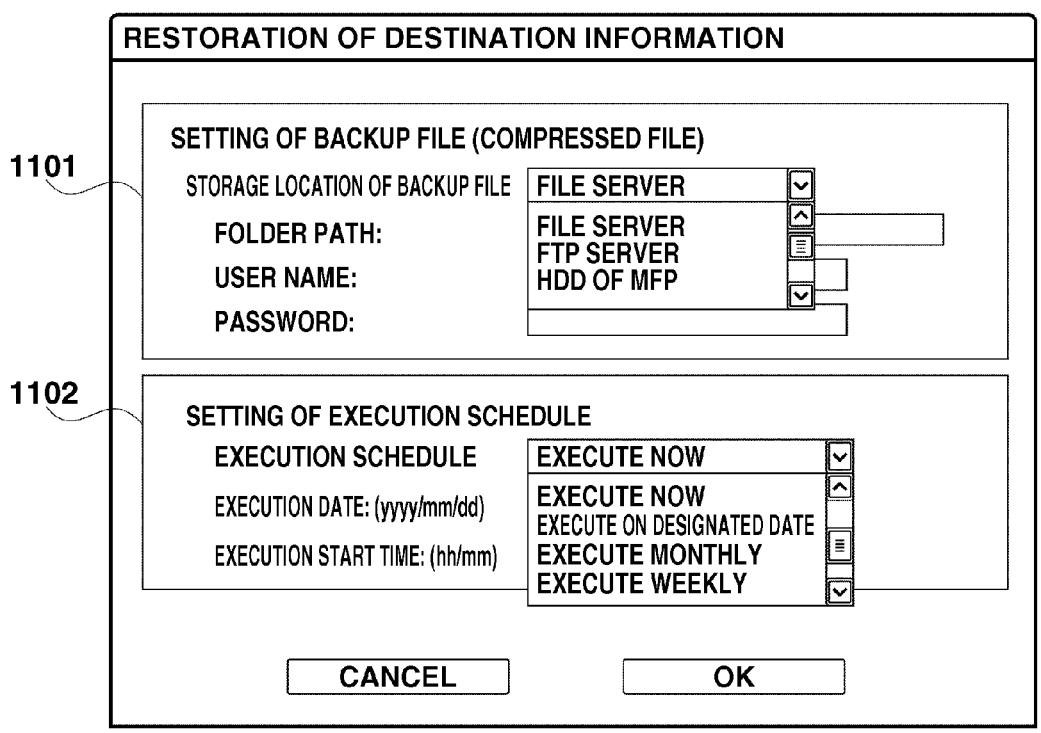
FIG. 11 is a diagram illustrating one example of a screen for instructing restoration of destination information.

FIG. 11 illustrates a screen which is used for instructing restoration of the destination information 207a and is displayed on the operation panel 206 of the MFP 101 or the information processing apparatus 102 connected to the MFP 101 via the network 100. Since the purpose of the restoration of destination information is to input a backup file without editing, into the MFP and to restore the destination information to the information described in the file, a compressed file is designated by the user. The restoration instruction is transmitted to the controller 201 via the operation panel 206 of the MFP 101 or the Web browser of the information processing apparatus 102, and the where a restoration instruction is transmitted from the information processing apparatus 102 will be described in the following exemplary embodiment.

A compressed file designation unit 1101 is used by a user for designating a storage location of a compressed file of destination information, and a designation method is the same as that of the storage location setting unit 501. Also, an execution schedule setting unit 1102 is used for designating an execution schedule of restoration and same as the execution schedule setting unit 503 illustrated in FIG. 5. The storage location of the compressed file, the execution schedule, and other settings are not limited to those described in the present exemplary embodiment.

Figure 12:
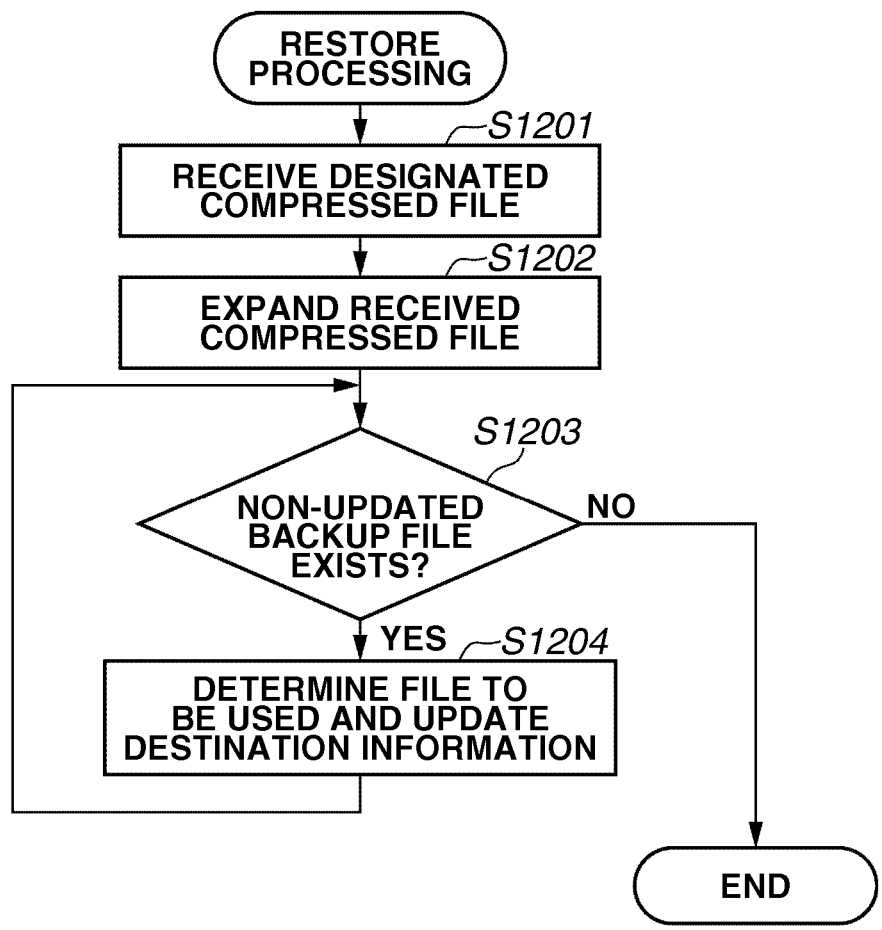
FIG. 12 is a flowchart illustrating processing of the restoration of destination information.

FIG. 12 illustrates a processing flowchart of restoration processing of destination information 207a, which is processing executed by the controller 201 of the MFP 101 when the restore execution is instructed by the information processing apparatus 102 based on the execution schedule set in FIG. 11.

In step S1201, the controller 201 acquires a designated compressed file and receives the acquired compressed file. Since both of the ABK file and the CSV file are contained in the compressed file, the plurality of files of different file formats are received. In step S1202, the controller 201 expands the compressed file received by the file reception processing of step S1201.

In step S1203, the controller 201 determines whether there is a backup file (non-updated backup file) of which the corresponding destination information 207a is not updated among the expanded backup files. The processing proceeds to step S1204 when it is determined that there is the non-updated backup file (Yes in step S1203), while the restore processing is terminated when it is determined that there is not any non-updated backup file and that all of the corresponding destination information 207a is updated (No in step S1203).

In step S1204, the controller 201 determines the file to be used for restoration among the ABK file and the CSV file contained in the expanded backup file and updates the destination information 207a by using the determined file. Since the backup file is not edited in the restoration, the ABK file having the short update processing time is determined to be a file to be used with priority in the MFP 101.

As described above, when the compressed file containing the plurality of files of which the file formats are different from one another are received, the file to be used is determined among the plurality of received files according to the conditions, thereby making it possible to shorten the update processing time in the restore.

FIG. 13 illustrates a screen which is used for instructing an import of the destination information 207a and displayed on the operation panel 206 of the MFP 101 or the information processing apparatus 102 connected to the MFP via the network 100. A purpose of the import of destination information is to update the destination information to information described in a backup file by editing the backup file when so required and inputting the backup file into the MFP. The import instruction is transmitted to the controller 201 via the operation panel 206 of the MFP 101 or the Web browser of the information processing apparatus 102, and the where the import instruction is given from the information processing apparatus 102 will be described in the following exemplary embodiment.

A backup file designation unit 1301 is used by a user for designating a storage location of a backup file of destination information. As a method for designating a backup file by a user, there are following three methods.
Method 1: Designate one of backup files in ABK format.
Method 2: Designate one of backup files in CSV format.
Method 3: Designate a folder in which a plurality of backup files in ABK format and a plurality of backup files in CSV format are contained.

Method 1 and Method 2 are designation methods used when updating destination information of one destination table. Though the ABK format is the file format that is difficult for a user to edit, it is possible to import an ABK file by high speed processing as compared to the CSV file when the user edits the ABK file. The CSV format enables easier file editing as compared to the ABK format. Method 3 is the designation method employed when updating a plurality of pieces of destination information of a plurality of destination tables. For example, when the user expands the compressed file as illustrated in FIG. 7 and edits several files in the expanded folder, it is possible to designate the folder according to Method 3. In the folder, both of edited files and unedited files may be contained.

A method for designating a folder/file path, a user name, and a password is the same as the storage location setting unit 501 in FIG. 5. An execution schedule setting unit 1302 is used for designating an execution schedule of import, which is the same as the execution schedule setting unit 503 illustrated in FIG. 5.

A priority condition setting unit 1303 is enabled when the folder is designated in Method 3 by the backup file designation unit 1301. The setting is used for setting which one of backup files is to be used when two backup files are present for one destination information of a destination table in the designated folder. In the present exemplary embodiment, it is possible to select one of the following three priority conditions.

Place priority on a backup file having a newer date of update.

Place priority on a backup file in CSV format (place priority on a CSV file).

Place priority on a backup file in ABK format (place priority on an ABK file).

The method for designating a backup file, the execution schedule, and other settings are not limited to the contents described in the present exemplary embodiment. Also, the setting of the priority condition for placing priority on one of a plurality of files having the same destination information of a destination table is not limited to the three settings described in the present exemplary embodiment.

FIG. 14 illustrates a processing flowchart of import processing of the destination information 207a, which is processing to be executed by the controller 201 of the MFP 101 when execution of import is instructed based on the execution schedule set in FIG. 13.

In step S1401, the controller 201 determines whether a file designated by the user by the backup file designation unit 1301 is the file of Method 1 or Method 2 or the folder of Method 3. It is thus determined that the file that is received as an object of the import is one of an ABK file and a CSV file or a plurality of files including a plurality of file formats. In the case of the file, i.e. when it is determined that the received file is not the plurality of files (1 in step S1401), the processing proceeds to step S1402. In the case of the folder, i.e. when the received file is a plurality of files in different file formats (2 in step S1401), the processing proceeds to step S1403.

In step S1402, the controller 201 updates the corresponding destination information 207a by using the designated ABK file or CSV file.

In step S1403, the controller 201 determines whether there is a backup file (non-updated backup file) of which the corresponding destination information 207a has not been updated in the designated folder. The processing proceeds to step S1404 when it is determined that there is the non-updated backup file (Yes in step S1403), while the import processing is terminated when it is determined that there is not any non-updated backup file and that the destination information 207a corresponding to all of the files in the folder is updated (No in step S1403).

In step S1404, the controller 201 confirms the setting contents in the priority condition setting unit 1303. When the priority condition is "place priority on a backup file having a newer date of update" (1 in step S1404), the processing proceeds to step S1405. When the priority condition is "place priority on a backup file in CSV format" (2 in step S1404), the processing proceeds to step S1406. When the priority condition is "place priority on a backup file in ABK format" (3 in step S1404), the processing proceeds to step S1407.

In step S1405, the controller 201 determines that the backup file having the newer date of update is to be used for the update among the ABK files and the CSV files corresponding to the identical destination information. The controller 201 updates the destination information 207a by using the determined file. For example, when a user has edited a CSV file for import, the CSV file has a newer date of update than the ABK file, and the controller 201 places priority on the file in CSV format to determine the file to be used. More specifically, the CPU 201 determines whether the user has edited a backup file and, when it is determined that the file has been edited, automatically imports the edited file. In the flowchart of backup illustrated in FIG. 10, the CPU 201 creates the ABK file in step S1004 after creating the CSV file in step S1003. Therefore, the file in ABK format has a newer date of update when file editing is not performed by the user, and the ABK file is used with priority when the file editing is not performed in the import. Therefore, it is possible to automatically shorten the update processing time when editing is not performed. The update dates are controlled in the order of file output in the present exemplary embodiment, but the configuration is not limited to this. For example, it is possible to adapt a configuration in which one or both of update dates is/are changed after creating the ABK and the CSV files in such a manner that the update date of the ABK file is newer than that of the CSV file.

In step S1406, the controller 201 updates the destination information 207a by using the CSV file. In step S1407, the controller 201 updates the destination information 207a by using the ABK file. When the user is familiar with handling of ABK files, it is possible to shorten the update processing time by using this setting.

By the above-described backup and update processing, the user is enabled to selectively use the appropriate file format depending on the usage of the restoration or the import of the setting information.

In the above-described exemplary embodiment, each of the restoration instruction and the backup instruction is sent from the information processing apparatus 102 to the controller 201 of the MFP 101 by the operations on the screens separately provided for the users. However, the configuration is not limited to this. For example, the number of types of the screens for the update processing including the restore and the import may be one, and the controller 201 that has received the update processing may automatically determine whether the usage desired by the user is restore or import depending on the file selected by the user. The processing may be executed according to the determination by the controller 201. Since it is highly likely that editing by the user has not been performed when a ZIP file or an ABK file is selected by the user, the controller 201 determines that the restoration instruction has been given. Also, since it is highly likely that editing by the user has been performed when a CSV file or a CSV file and an ABK file of which dates of updates are different from each other by a certain degree is/are selected by the user, the controller 201 determines that the import instruction has been given. The determinations may preferably be conducted by the controller 201.

For example, a user sends an update instruction to the controller 201 after designating an import usage or a restore usage on the update processing screen. Upon reception of the update instruction, the controller 201 may appropriately select a file to be used for the processing among the files designated in the instruction depending on the usage designated by the user. When the designation by the user is the import usage, the controller 201 selects a CSV file or a file having a newest date of update, which is highly likely edited, as the file to be used for the processing. When the designation by the user is the restore usage, the controller 201 may desirably select an ABK file or a file having an oldest date of update, which is not likely edited, as the file to be used for the processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-278012 filed Dec. 7, 2009, which is hereby incorporated by reference herein in its entirety.

What is claimed is:

1. An information processing apparatus having a storage unit storing setting information of the information processing apparatus, the information processing apparatus comprising:
   a specifying unit that specifies files in a location designated by a user, the specified files including both of a file in a first file format and a file in a second file format, wherein the first file format and the second file format are different from each other;
   a determination unit that determines, on the basis of each file format of the specified files, one of the specified files to be used for updating the stored setting information; and
   an updating unit that updates the stored setting information using the determined file such that the stored setting information is updated without using any files other than the determined file among the specified files, wherein the updating unit is capable of updating the stored setting information using the file in the first file format without using the file in the second file format and is capable of updating the stored setting information using the file in the second file format without using the file in the first file format,
   wherein the file in the first file format and the file in the second file format are derived from the stored setting information and include similar contents, and
   wherein the determination unit determines the file in the first file format to be used for the updating from among the specified files.

2. The information processing apparatus according to claim 1, wherein the information processing apparatus is a printer which functions as a multi function peripheral.

3. The information processing apparatus according to claim 1, wherein the first file format requires a shorter time for updating setting information of the information processing apparatus stored in the storage unit at least when compared to the second file format.

4. The information processing apparatus according to claim 1, wherein the second file format is more easily editable by a user at least when compared to the first file format.

5. The information processing apparatus according to claim 1, wherein the determination unit places priority on a file having a newest date of update from among the specified files.

6. The information processing apparatus according to claim 5, wherein the file creating unit creates the first and second files in a manner such that a date of update of the first file in the first file format, which requires a shorter time of update processing by the update unit as compared to the second file format, is newer than a date of update of the second file in the second file format.

7. The information processing apparatus according to claim 1, further comprising a sending unit that sends information to an external destination,
   wherein the setting information is destination information indicating the external destination of sending, when performing the sending by the sending unit.

8. The information processing apparatus according to claim 1, wherein the first file format requires a shorter time for updating setting information of the information processing apparatus stored in the storage unit when compared to the second file format, and
   wherein the second file format is easier for a user to edit when compared to the first file format.

9. The information processing apparatus according to claim 8, wherein the second file format is a comma separated values (CSV) format.

10. The information processing apparatus according to claim 1, wherein the specifying unit specifies, in response to an import instruction given, a folder including one or more files, and
    wherein the determination unit determines, in a case where the specified folder includes both of a file in the first file format and a file in the second file format, the file in the first file format to be the file used for the updating.

11. The information processing apparatus according to claim 1, wherein,
    in a case where the number of the specified files is one and the one specified file is in the first file format, the determination unit determines the one specified file in the first format to be the file used for the updating,
    in a case where the number of the specified files is one and the one specified file is in the second file format, the determination unit determines the one specified file in the second format to be the file used for the updating, and
    in a case where the number of the specified files is more than one and the specified files include both of a file in the first file format and a file in the second file format, the determination unit determines the file in the first file format to be the file used for the updating.

12. The information processing apparatus according to claim 1, further comprising:
    a creating unit that creates, in response to a backup instruction given, both a first file in the first file format and a second file in the second file format from identical setting information of the information processing apparatus stored in the storage unit, wherein information described in the first file is the same as information described in the second file; and
    an outputting unit that outputs, in response to the backup instruction given, both of the first file and the second file.

13. The information processing apparatus according to claim 12, wherein the creating unit further creates a compressed file in a compression format including the first and second files,
    wherein the outputting unit outputs the created compressed file, and wherein the determination unit determines, in a case where the specified file is a compressed file in the compression format, one of the files included in the specified compressed file to be the file used for updating setting information of the information processing apparatus stored in the storage unit, on the basis of a file format of each file included in the specified compressed file.

14. The information processing apparatus according to claim 13, wherein the specifying unit includes:
an obtaining unit that obtains a compressed file in the compression format; and
a decompressing unit that decompresses the obtained compressed file including both of the file in the first file format and the file in the second file format.

15. The information processing apparatus according to claim 12, wherein the creating unit further creates a compressed file in a compression format including the first and second files,
wherein the outputting unit outputs the created compressed file,
wherein the specifying unit specifies, in response to a restoration instruction given, a compressed file in a compression format, and
wherein the determination unit determines, in a case where the specified compressed file includes both of a file in the first file format and a file in the second file format, the file in the first file format to be the file used for the updating.

16. The information processing apparatus according to claim 12, wherein the creating unit further creates a compressed file in a compression format including the first and second files,
wherein the outputting unit outputs the created compressed file,
wherein, in response to a restoration instruction given,
the specifying unit specifies a compressed file in a compression format, the compressed file being located in the information processing apparatus or a server outside the information processing apparatus, and
the determination unit determines, in a case where the specified compressed file includes both of a file in the first file format and a file in the second file format, the file in the first file format to be the file used for the updating, and
wherein, in response to an import instruction given,
the specifying unit specifies a folder including one or more files, the folder being located in a server outside the information processing apparatus, and
the determination unit determines, in a case where the specified folder includes both of a file in the first file format and a file in the second file format, the file in the first file format to be the file used for the updating.

17. An information processing system for updating setting information used by a printer, comprising:
a storage unit that stores setting information of the printer;
a specifying unit that specifies files in a location designated by a user;
a determination unit that determines one of the specified files to be used for updating the stored setting information; and
an updating unit that updates the stored setting information using the determined file,
wherein the specified files include both of a file in a first file format and a file in a second file format which are derived from the stored setting information, include similar contents, and are respectively able to be determined to be used for the updating,
wherein the first file format and the second file format are different from each other,
wherein the determination unit determines the file in the first file format to be used for the updating from among the specified files, and
wherein the stored setting information is updated without using any files other than the determined file among the specified files.

18. An information processing system for updating address information used by a printer, comprising:
a storage unit that stores address information used for sending data by the printer;
a creating unit that creates, in response to a backup instruction given, both a file in a first file format and a file in a second file format from identical address information stored in the storage unit, information described in the created file in the first file format being the same as information described in the created file in the second file format;
an outputting unit that outputs, in response to the backup instruction given, both of the first file and the second file;
a specifying unit that specifies a location designated by a user; and
an updating unit that updates the stored address information using a file included in the specified location,
wherein the first file format requires a shorter time for updating the stored address information than the second file format,
wherein the second file format enables a user to edit data more easily than the first file format,
wherein the information processing system is set to a setting for the updating that a file in the first file format is to be used for updating the stored address information, and
wherein the updating unit
updates, in a case where the specified location includes a file in the first file format and does not include a file in the second file format, the stored address information using the file in the first file format included in the specified location without using any files other than the file in the first file format among files included in the specified location,
updates, in a case where the specified location does not include a file in the first file format and includes a file in the second file format, the stored address information using the file in the second file format included in the specified location without using any files other than the file in the second file format among files included in the specified location, and
updates, in a case where the specified location includes both of a file in the first file format and a file in the second file format, the stored address information using the file in the first file format included in the specified location without using any files other than the file in the first file format among files included in the specified location.

19. The information processing system according to claim 18, wherein the second file format is a comma separated values (CSV) format.

20. The information processing system according to claim 18, wherein the updating unit
updates, in a case where the specified location includes only a file in the first file format, the stored address information using the file in the first file format included in the specified location without using any files other than the file in the first file format among files included in the specified location, updates, in a case where the specified location includes only a file in the second file format, the stored address information using the file in the second file format included in the specified location without using any files other than the file in the second file format among files included in the specified location, and updates, in a case where the specified location includes both of a file in the first file format and a file in the second file format, the stored address information using the file in the first file format included in the specified location without using any files other than the file in the first file format among files included in the specified location.

21. The information processing system according to claim 18, wherein the specifying unit specifies, in response to an import instruction given, a location of a folder included in a server as the location.

22. The information processing system according to claim 18, wherein the specifying unit specifies, in response to a restoration instruction given, a location of a compressed file in a compression format included in either of the printer or a server.

23. The information processing system according to claim 18, wherein the specifying unit specifies, in response to an import instruction given, a location of a folder included in a server as the location, and wherein the specifying unit specifies, in response to a restoration instruction given, a location of a compressed file in a compression format included in either of the printer or a server.

24. The information processing system according to claim 18, wherein the creating unit further creates, in response to the backup instruction given, a compressed file in a compression format including both of the first and second files, and wherein the outputting unit outputs, in response to the backup instruction given, the created compressed file to a location designated by a user.

* * * * *